United States Patent
Cox et al.

[11] 3,720,717
[45] March 13, 1973

[54] CONCENTRATING AQUEOUS ACETONE

[75] Inventors: Terence Cox; William Featherstone, both of Stockton-on-Tees, England

[73] Assignee: Imperial Chemical Industries, Limited, London, England

[22] Filed: Sept. 24, 1970

[21] Appl. No.: 75,799

[30] Foreign Application Priority Data

Sept. 30, 1969 Great Britain.....................48,067/69

[52] U.S. Cl..............................................260/593 P
[51] Int. Cl...............................................C07c 49/08
[58] Field of Search ..................................260/593 P

[56] References Cited

UNITED STATES PATENTS

| | | | |
|---|---|---|---|
| 3,062,905 | 11/1962 | Jennings et al. | 260/593 P |
| 3,193,582 | 7/1965 | Adams et al. | 260/593 P |

*Primary Examiner*—Daniel D. Horwitz
*Attorney*—Cushman, Darby & Cushman

[57] ABSTRACT

Removal of water, possibly in already low concentration, from aqueous acetone by pervaporation techniques in which a water enriched phase permeates a selective membrane. In an alternative, a fluid is caused to sweep the permeate fraction off the far side of the membrane.

5 Claims, No Drawings

CONCENTRATING AQUEOUS ACETONE

This invention relates to methods of concentrating aqueous acetone media to provide acetone of very low water content.

Distillation is the commonly used method of stripping aqueous organic phases of the greater part of their water contents. In the case of acetone/water mixtures virtually complete removal of water is possible by this method but when concentration to an acetone content exceeding 99 percent by weight is required the cost becomes increasingly high and is prohibitive for bulk production of acetone containing less than 0.5 percent water.

This invention is directed at providing an alternative method of obtaining such highly concentrated acetone fractions from more dilute aqueous acetone media and involves the technique known as pervaporation.

Pervaporation is a technique of separating mixtures of liquid components by exploiting the different rates at which the components by exploiting the different rates at which the components pass into and permeate through a non-porous membrane, the permeate fraction being removed from the far side of the membrane as vapor. Important factors bearing on the rate of permeation of a species through a membrane are the shape/size characteristics of the species, having regard to the dimensions of available pathways through the membrane, and the ability of the membrane substance to absorb or dissolve the permeating species, which is a function of the chemical similarities between the membrane substance and the permeating species.

As far as resolving liquid mixtures is concerned, the method has been studied primarily as a means of separating components that form azeotropes which are accordingly unresolvable by distillation. The method is, however, basically applicable equally to other liquid/liquid mixtures.

The Applicants have discovered that a non-permeate fraction containing not less than 99.5 percent by weight of acetone is readily obtainable from less concentrated aqueous acetone media by pervaporation. This was an entirely unexpected discovery; it could not have been predicted from the literature on pervaporation that such a very high degree of concentration of aqueous acetone would be achievable.

Thus, the present invention provides a method of concentration an aqueous acetone medium to an acetone content exceeding 99 percent by weight, preferably not less than 99.5 percent by weight, which comprises bringing an acetone/water mixture in the liquid phase into contact with one side of a suitable non-porous hydrophilic membrane in a separation zone and causing a permeate enriched in water to be removed as vapor from the other side of the membrane, and, when the non-permeate fraction attains a concentration of not less than 99 percent, preferably not less than 99.5 percent by weight of acetone, removing it from the separation zone.

Clearly, the more concentrated the feed aqueous acetone already is, the less time will be required to attain the desired level of acetone concentration in the non-permeate fraction.

Thus, while the method of the present invention may be used on any aqueous acetone mixture, it is most usefully applied to feed aqueous acetone media containing more than, say, 95 percent or better 98 percent, by weight of acetone. Preferably, therefore, the feed mixture contains between 98 percent and 99 or 99.5 percent by weight of acetone. Membranes used for pervaporation studies are formed of synthetic or "semi-synthetic" polymeric materials and tend to be selected for a particular purpose on the basis of "like being suitable for like". Thus, when the permeating species is or are hydrocarbons, hydrophobic materials are used as the membranes, for example polypropylene, but where the permeating species is or are hydrophilic, e.g. water or a lower alcohol, then a membrane of a hydrophilic character such as perhaps cellulose acetate would be chosen. There are, however, additional to these broad generalizations, other important factors which might in given instances restrict further the freedom of choice. Thus, the membrane should not be physically or chemically destroyed or adversely modified by the liquid medium being treated, and it is for this reason that cellulose acetate could not be used for resolving acetone media. Likewise undue swelling of the membrane structure by any component of the medium being treated might lead to poor selectivity through permitting a large degree of ingress of another component into the membrane and transport of that component through the membrane by encapsulation. Further, it will almost invariably be required that the desired product be the non-permeate fraction.

Surprisingly, the Applicants have observed that the capability of concentrating aqueous acetone mixtures to the aforesaid degree is possessed by numerous hydrophilic membranes. Thus, suitable membranes may be formed from the several nylon polymers, for example nylons 6 and 66, regenerated cellulose, cellulose ethers that are not soluble in acetone, and polyvinyl alcohol (including polyvinyl alcohol polymers containing varying degrees of residual acetylation). As expected from general considerations, hydrocarbon polymers, polyesters and other substances of like hydrophobicity do not form suitable membranes. It is, however, a simple matter, theory apart, to test a membrane of a given polymer to ascertain whether or not it is chemically and physically stable towards aqueous acetone under process conditions to be used and to determine the extent to which the membrane is swollen by water. Too little swelling (indicating hydrobicity) leads to a poor throughput of water; too great swelling on the other hand would lead to poor selectivity for the reason outlined before.

The selection of generally suitable operation conditions is incidental to the present invention and fuller guidance on this is available from the literature on pervaporation processes. Broadly it can be said that the pressure in the permeate zone (causing rapid removal of vapor from the far surface of the membrane) may be as low as 10 mm. of mercury or even lower. The pressure on the liquid phase in the non-permeate zone need ordinarily not be substantially higher than that necessary to maintain a liquid phase at the operating temperature. Accordingly pressure in this zone of from atmospheric to at most, say, 500 p.s.i.g. will be convenient. A working temperature within the range of from 0° to 200°C, preferably 90° to 150°C, will ordinarily be used, higher temperatures in this range being attended by higher permeation rates. It is preferred that the membrane used be as thin as possible. In practice, this means effective thicknesses down to about 0.01 mils. All useful membranes are likely to be less than 5 mils in overall thickness and a convenient practical working range of thicknesses is perhaps 0.1 to 1.0 mils.

It is preferred to use in the process aqueous acetone media substantially free of other impurities, and impurities readily removable by distillation should desirably be removed in this way as well as any gross excess of water. A very suitable acetone medium for treatment by the present process is aqueous acetone obtained as co-product in the well-known process of phenol production from cumene. A preliminary distillation to remove the bulk of its water content is desirable, when any high molecular weight impurities will be removed as heavy ends.

The following Example illustrates the invention:

EXAMPLE

In these Examples aqueous mixtures were resolved to produce essentially pure acetone. Conditions in each Example were as listed in the table. Permeate vapors were continuously withdrawn and condensed. Analyses were performed to give the composition of permeate and non-permeate. Successive portions of the permeate had a decreased concentration of water.

| Membrane substance | Regenerated cellulose | Nylon 6 | Poly(vinyl alcohol) |
| --- | --- | --- | --- |
| Membrane thickness | 0.00085" | 0.00075" | 0.0012" |
| Feed composition | 1.31 wt. percent water, 98.69 wt. percent acetone. | 1.28 wt. percent water, 98.72 wt. percent acetone. | 1.33 wt. percent water, 98.67 wt. percent acetone. |
| Feed volume | 1,000 mls | 1,000 mls | 1,000 mls. |
| Non-permeate composition | 0.43 wt. percent water, 99.57 wt. percent acetone. | 0.25 wt. percent water, 99.75 wt. percent acetone. | 0.49 wt. percent water, 99.51 wt. percent acetone. |
| Range of permeate | 35-40 wt. percent water | 12-32 wt. percent water | 4-22 wt. percent water. |
| Volume total permeate | About 30 mls | About 50 mls | About 80 mls. |
| Feed temperature | About 110° C | About 110° C | About 100° C. |
| Feed pressure | About 80 p.s.i.g | About 70 p.s.i.g | About 80 p.s.i.g. |
| Permeate zone pressure | 50 mm. Hg | 50 mm. Hg | 50 mm. Hg. |
| Mean permeation rate | About 0.15 l. m.$^{-2}$ hr.$^{-1}$ | About 0.2 l. m.$^{-2}$ hr.$^{-1}$ | About 0.75 l. m.$^{-2}$ hr.$^{-1}$. |

It will be clear that the permeate fraction could be concentrated by distillation and a suitable enriched acetone fraction recycled to the feed chamber for inclusion in subsequent treatment.

A modified or alternative procedure which may be used and which is in principal very closely related to the pervaporation method described in the foregoing is a procedure in which the permeate fraction is removed from the far side of the membrane, not by application of reduced pressure to the zone to which the permeate fraction passes, but by causing a fluid, which may be liquid or gas, to sweep the far side of the membrane, the fluid being one into which the permeate fraction readily passes and for example, becomes highly diluted and which is essentially inert to the membrane substance and so is incapable of being absorbed into the membrane to interfere with the movement therethrough of the permeate fraction or of substantially modifying the selectivity of the membrane substance for acetone/water separation. This procedure is especially applicable to operations in which the membrane is provided (as it may be in the pervaporation case aforedescribed) by hollow fiber structures, the stripping fluid being passed either through the fiber interiors or sweeping the exteriors of the fibers, as may be desired.

We claim:

1. A method of concentrating an aqueous acetone medium to an acetone content exceeding 99 percent by weight, preferably not less than 99.5 percent by weight, which comprises bringing an acetone/water mixture in the liquid phase into contact with one side of a non-porous hydrophilic membrane in a separation zone and causing a permeate enriched in water to be removed as vapor from the other side of the membrane, the membrane being an acetone/water stable membrane formed of a nylon, a regenerated cellulose, a cellulose ether, or a polyvinyl alcohol (including a polyvinyl alcohol containing a degree of residual acetylation) and, when the non-permeate fraction attains a concentration of not less than 99 percent, preferably not less than 99.5 percent by weight of acetone, removing it from the separation zone.

2. A method as claimed in claim 1 wherein the feed aqueous acetone contain more than 95 percent by weight of acetone.

3. A method as claim in claim 2 wherein the feed aqueous acetone contains from 98 to 99.5 percent by weight of acetone and a non-permeate fraction is removed having a water content less than 0.5 percent by weight.

4. A method as claimed in any one of claim 1 wherein the process is carried out at a temperature of from 90 to 150°C.

5. A method of concentrating an aqueous acetone medium to an acetone content exceeding 99 percent by weight which comprises bringing an acetone/water mixture in a liquid phase into contact with one side of a non-porous hydrophilic membrane in a separation zone and causing a permeate enriched in water to be removed from the other side of the membrane by passing over the membrane on that other side a stripping fluid, which may be liquid or gas, that is substantially inert to the membrane and does not substantially interfere with the selective passage of the permeate through the membrane and into which the permeate readily passes, the membrane being an acetone/water stable membrane formed of a nylon, a regenerated cellulose, a cellulose ether, or a polyvinyl alcohol (including a polyvinyl alcohol containing a degree of residual acetylation) and, when the non-permeate fraction attains a concentration of not less than 99 percent by weight of acetone removing it from the separation zone.

* * * * *